United States Patent
Cho et al.

(10) Patent No.: US 7,526,506 B2
(45) Date of Patent: Apr. 28, 2009

(54) INTERLINKING SPORTS AND TELEVISION PROGRAM LISTING METADATA

(75) Inventors: Wei Wei Ada Cho, Issaquah, WA (US); Paul D. Deeds, Seattle, WA (US); Todd San Jule, Woodinville, WA (US); Samuel D. Clement, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 199 days.

(21) Appl. No.: 11/234,006

(22) Filed: Sep. 23, 2005

(65) Prior Publication Data

US 2006/0088276 A1 Apr. 27, 2006

Related U.S. Application Data

(63) Continuation-in-part of application No. 10/970,602, filed on Oct. 21, 2004.

(51) Int. Cl.
*G06F 7/00* (2006.01)
*G06F 17/30* (2006.01)
*H04N 7/173* (2006.01)

(52) U.S. Cl. .................................. 707/104.1; 725/105

(58) Field of Classification Search ...................... 707/6, 707/102, 104.1; 725/39, 46, 58, 133–135, 725/105; 386/46, 125, 83, 68
See application file for complete search history.

(56) References Cited

U.S. PATENT DOCUMENTS

| | | | |
|---|---|---|---|
| 4,879,611 A | 11/1989 | Fukui et al. | |
| 5,189,630 A | 2/1993 | Barstow et al. | |
| 5,541,738 A | 7/1996 | Mankovitz | |
| 5,666,645 A | 9/1997 | Thomas et al. | |
| 5,808,694 A | 9/1998 | Usui et al. | |
| 5,977,964 A | 11/1999 | Williams et al. | |
| 5,995,155 A | 11/1999 | Schindler et al. | |
| 6,049,333 A | 4/2000 | LaJoie et al. | |
| 6,052,145 A | 4/2000 | Macrae et al. | |
| 6,061,680 A | 5/2000 | Scherf et al. | |
| 6,154,773 A | 11/2000 | Roberts et al. | |
| 6,268,849 B1 | 7/2001 | Boyer et al. | |
| 6,286,037 B1 * | 9/2001 | Matsuura | 709/220 |
| 6,490,001 B1 | 12/2002 | Shintani et al. | |
| 6,571,392 B1 | 5/2003 | Zigmond et al. | |

(Continued)

FOREIGN PATENT DOCUMENTS

DE 19501086 A1 9/1995

(Continued)

OTHER PUBLICATIONS

Silverberg E., "Using the Program Guide in Windows XP Media Center Edition," Using Windows XP, Feb. 9, 2004, 8 pages, Microsoft Corporation, U.S.A.

(Continued)

*Primary Examiner*—Hung T Vy
(74) *Attorney, Agent, or Firm*—Senniger Powers LLP

(57) ABSTRACT

Matching metadata for sporting events with television program listing data. A global sports format enables the import of sports metadata from various providers. The metadata is interlinked with the television program listing data via configurable match rules or criteria. An enhanced electronic programming guide is created to display, to a user, the interlinked metadata.

18 Claims, 6 Drawing Sheets

U.S. PATENT DOCUMENTS

| | | |
|---|---|---|
| 6,615,248 B1 | 9/2003 | Smith |
| 6,766,526 B1 | 7/2004 | Ellis |
| 6,925,650 B1* | 8/2005 | Arsenault et al. ............. 725/39 |
| 7,210,159 B2 | 4/2007 | Roop et al. |
| 7,440,674 B2* | 10/2008 | Plotnick et al. ............... 386/68 |
| 2002/0083464 A1 | 6/2002 | Tomsen et al. |
| 2002/0083468 A1* | 6/2002 | Dudkiewicz ................. 725/133 |
| 2002/0110360 A1* | 8/2002 | Potrebic ...................... 386/83 |
| 2002/0152463 A1* | 10/2002 | Dudkiewicz ................. 725/46 |
| 2002/0157098 A1 | 10/2002 | Zustak et al. |
| 2002/0157099 A1 | 10/2002 | Schrader et al. |
| 2002/0157101 A1 | 10/2002 | Schrader et al. |
| 2002/0166123 A1* | 11/2002 | Schrader et al. .............. 725/58 |
| 2002/0178449 A1 | 11/2002 | Yamamoto et al. |
| 2003/0023975 A1 | 1/2003 | Schrader et al. |
| 2003/0028796 A1 | 2/2003 | Roberts et al. |
| 2003/0028882 A1 | 2/2003 | Davis et al. |
| 2003/0051246 A1 | 3/2003 | Wilder et al. |
| 2003/0070170 A1 | 4/2003 | Lennon |
| 2003/0077067 A1 | 4/2003 | Wu et al. |
| 2003/0135856 A1 | 7/2003 | Hancock et al. |
| 2003/0213001 A1 | 11/2003 | Yuen et al. |
| 2003/0233653 A1 | 12/2003 | Hwang et al. |
| 2004/0003403 A1 | 1/2004 | Marsh |
| 2004/0040041 A1 | 2/2004 | Crawford |
| 2004/0068739 A1 | 4/2004 | Russ et al. |
| 2004/0154039 A1* | 8/2004 | Simms et al. ................. 725/39 |
| 2004/0205698 A1* | 10/2004 | Schliesmann et al. ....... 717/106 |
| 2004/0216156 A1 | 10/2004 | Wagner |
| 2004/0221308 A1* | 11/2004 | Cuttner et al. ................ 725/46 |
| 2005/0005290 A1 | 1/2005 | Kamen |
| 2005/0055715 A1* | 3/2005 | Minnick et al. ................ 725/58 |
| 2005/0138672 A1* | 6/2005 | Stone .......................... 725/134 |
| 2005/0152686 A1 | 7/2005 | Takashimizu et al. |
| 2007/0002175 A1 | 1/2007 | Narushima et al. |
| 2008/0028101 A1 | 1/2008 | Dewa |

FOREIGN PATENT DOCUMENTS

| | | |
|---|---|---|
| EP | 1383325 A2 | 1/2004 |
| EP | 1558028 A2 | 7/2005 |
| FR | 2818074 A1 | 6/2002 |
| WO | WO 96/31980 A1 | 10/1996 |
| WO | WO 99/35849 A1 | 7/1999 |
| WO | WO 00/33576 A1 | 6/2000 |
| WO | WO 00/52928 A1 | 9/2000 |
| WO | WO 00/72582 A1 | 11/2000 |
| WO | WO 01/39494 A1 | 5/2001 |
| WO | WO 2004/051988 A1 | 6/2004 |

OTHER PUBLICATIONS

Unknown, "Windows XP Media Center Edition 2005 Experience," Oct. 12, 2004, 1 page, Microsoft Corporation, U.S.A.

Unknown, "Electronic Programme Guide," Digital Cable TV, printed Sep. 22, 2005, 1 page, Hathway Datacom Pvt. Ltd., India.

Unknown, "Shaw Cable and Satellite: Star Choice Interactive Program Guide," Case Studies, printed Sep. 22, 2005, 3 pages, GIST Communications, Inc., U.S.A.

* cited by examiner

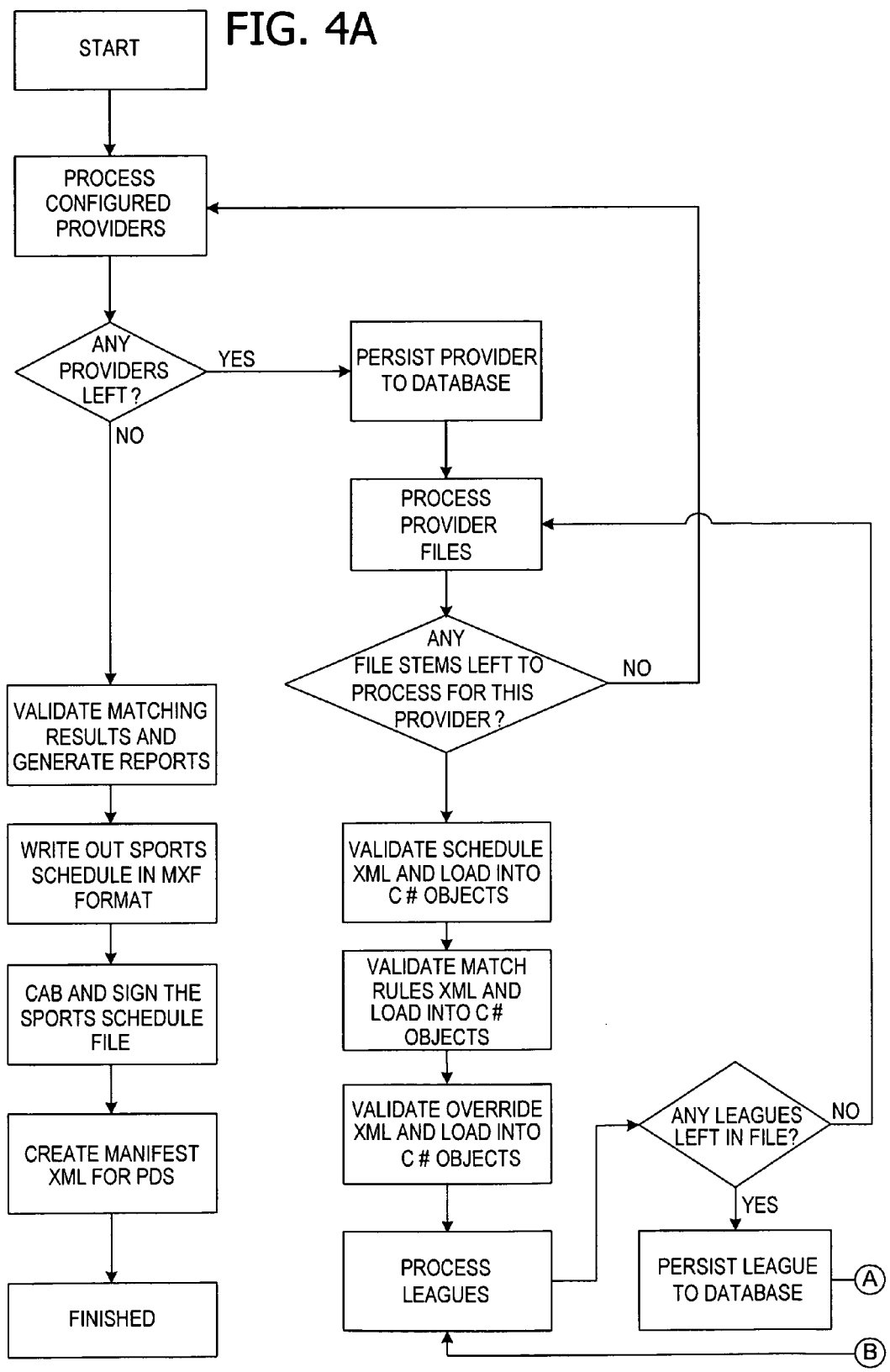

INTERLINKING SPORTS AND TELEVISION PROGRAM LISTING METADATA

CROSS-REFERENCE TO RELATED APPLICATION

This application is a continuation-in-part of co-pending U.S. patent application Ser. No. 10/970,602, filed Oct. 21, 2004, entitled "Methods, Computer Readable Mediums and Systems for Linking Related Data From At Least Two Data Sources Based Upon a Scoring Algorithm," hereby incorporated by reference.

BACKGROUND

An electronic programming guide provides users with program listing information including dates and times of programs delivered via broadcast, cable, satellite, or the Internet. Exemplary programs include news shows, situation comedies, infomercials, and sporting events. The electronic programming guide may include a brief description of each program, a rating, an abbreviated list of actors, or other metadata. For sporting events, however, typical electronic programming guides do not include such information because the metadata about each sporting event is dynamic. For example, batting statistics for a baseball player may change as a result of a recent game, individual game schedules may change on short notice, the composition and organization of leagues change from season to season, and different sports have different sets of metadata attributes (e.g., baseball has a pitcher name while football has a quarterback name). Further, televised sports program listings are also dynamic and may change with little notice. For at least these reasons, interlinking sporting event metadata and television program listing metadata is difficult.

SUMMARY

Embodiments of the invention import metadata related to sporting events and interlink this metadata with television program listing metadata to provide an exhaustive and up-to-the-minute electronic programming guide (EPG) listing. In an embodiment, the invention is flexible, configurable and extensible to accommodate for changes to the metadata. Rules for interlinking the metadata may be configured without modifying compiled software code.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
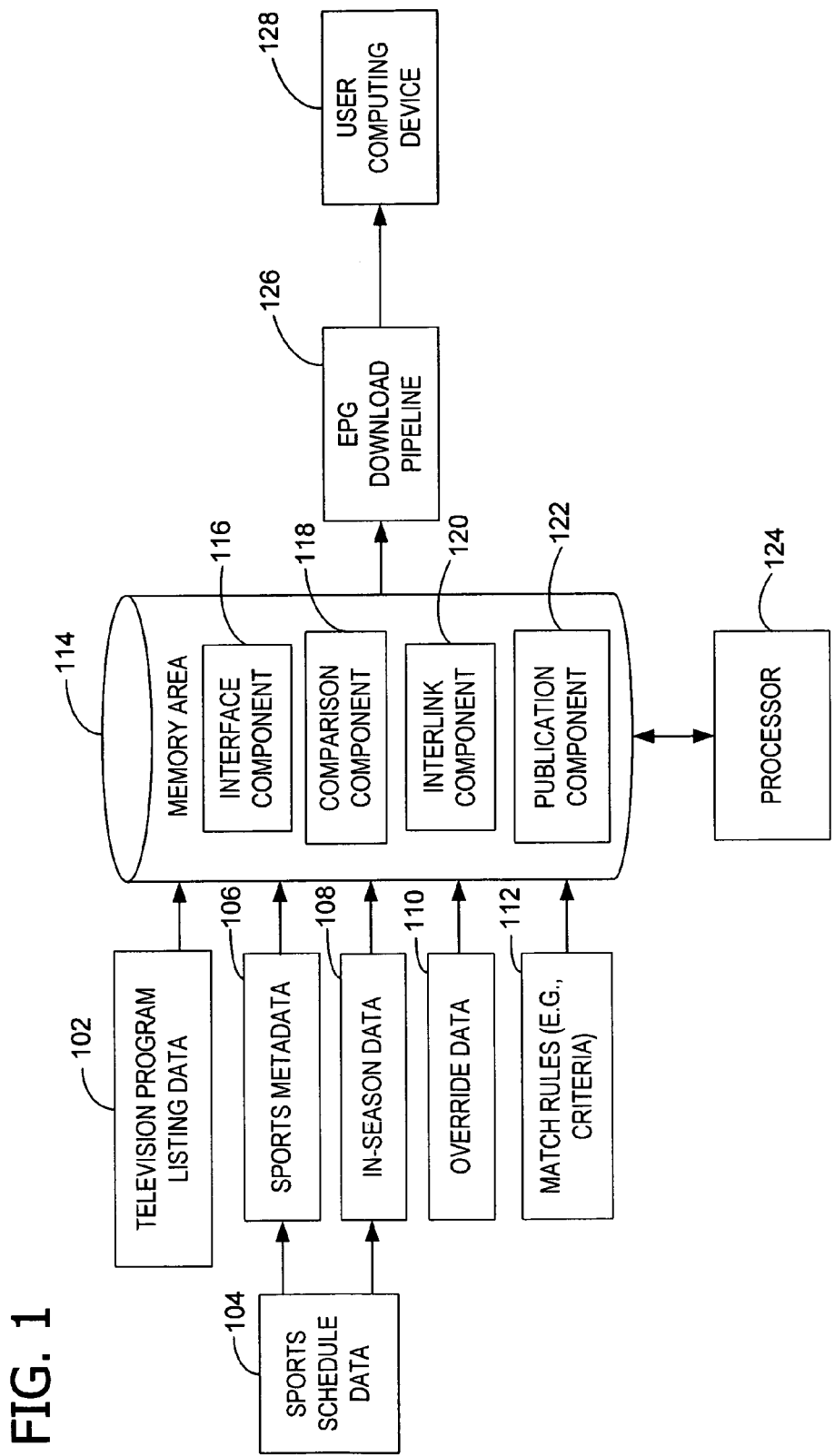
FIG. 1 is an exemplary block diagram illustration a suitable exemplary operating environment in which embodiments of the invention may be implemented.

Referring first to FIG. 1, an embodiment of the invention creates an enhanced electronic programming guide including metadata for sporting events. In particular, the invention includes configurable rules or criteria 112 for matching sports schedule data 104 with sporting events listed in television program listing data 102 in an extensible and flexible manner. The rules 112 are configurable such that changes to the rules 112 (e.g., to accommodate for changes to the data fields in the sports schedule data 104) do not necessitate code changes or recompilation of binary files implementing aspects of the invention. The configurable rules 112 allow a rapid response to changes in the sports schedule data 104 (e.g., new leagues or games added, new data providers) or the television program listing data 102 with minimal manual effort. For example, individual game schedules, player line-ups and televised program listings may change on short notice. Further, different sports may have different metadata attributes. Adding new metadata attributes may be performed by the match rules 112, specified on a per-league basis, which may be easily configured without writing any custom code to encapsulate the attributes.

FIG. 1 includes one or more computer-readable media such as memory area 114 having computer-executable components for creating an enhanced electronic programming guide. Exemplary components include an interface component 116, a comparison component 118, an interlink component 120, and a publication component 122. The interface component 116 receives the sports schedule data 104 from a sports data provider (not shown), the television program listing data 102 from an electronic programming guide provider (not shown), and one or more configurable criteria or match rules 112 defining characteristics of the sporting events from a rules provider. The sports schedule data 104 includes sports metadata 106 for a plurality of sporting events and in-season data 108. For example, the sports metadata 106 may include a list of games organized by league. For example, real-time sports metadata may be available for sporting events in the following leagues: basketball, football, baseball, hockey, and auto racing. Further, near real-time data may be available for other sports leagues.

The rules 112 define thresholds for matches between the sports schedule data 104 and the television program listing data 102. The television program listing data 102 may be received as a raw feed and then converted in a global listing format for storage in a database or other memory area. In one embodiment, a memory area such as memory area 114 stores the sports schedule data, the television program listing data, and the configurable match rules or criteria after receipt from the respective providers.

The comparison component 118 queries the television program listing data 102 for each of the plurality of sporting events based on the configurable match rules 112 to identify one or more television programs corresponding to each of the sporting events. The interlink component 120 matches the metadata for the plurality of sporting events with the television program listing data 102 as a function of the querying by the comparison component 118. The publication component 122 creates, for display to a user, an enhanced electronic programming guide with the metadata for the plurality of sporting events matched to the television program listing data 102 by the interlink component 120. A computing device such as processor 124 executes the interface component 116, the comparison component 118, the interlink component 120, and the publication component 122.

The enhanced electronic programming guide with the metadata for the plurality of sporting events matched to the television program listing data 102 is output by the interlink component 120 to an electronic programming guide (EPG) download pipeline 126 where the guide is readied for delivery to a user computing device 128.

In one embodiment, the interface component 116, the comparison component 118, the interlink component 120, and the publication component 122 include binary files. The processor 124 executes the binary files. When the match rules 112 are reconfigured (e.g., to accommodate for changes to the sports schedule data 104 or to the television program listing data 102), the binary files do not need to be recompiled to be operable with the reconfigured match rules 112.

In the example of FIG. 1, the components 116, 118, 120, 122 process override data 110 and in-season data 108. The override data 110 explicitly links the sporting events with particular sports metadata 106. In general, the override data 110 is stored in a data structure including a league identifier field storing a value representing a league identifier, a game identifier field storing a value representing a game identifier, and a program identifier field storing a value representing a television program listing. The in-season data 108 includes start and end dates for each league in the sports schedule data 104. The in-season data 108 may be used to validate the sports schedule data 104 received from the sports data provider.

In one embodiment, the sports metadata 106, in-season data 108, override data 110, and match rules 112 are received as extensible markup language (XML) data feeds. The XML data feeds are in a global sports format (GSF) received via hypertext transfer protocol (HTTP). Appendix A includes an exemplary implementation of the GSF. Embodiments of the invention recognize and process GSF data, which may include a plurality of schedules or leagues. In one embodiment, the XML data feeds are processed twice a day to create a local file for each league for storage and processing. The following table illustrates exemplary file names for various leagues.

TABLE 1

Exemplary Category Identifiers, Sports, and Corresponding File Names.

| CategoryID | Sport | File name |
|---|---|---|
| 49 | Major League Baseball | mlb.xml |
| 73 | National Basketball Association | nba.xml |
| 167 | Nascar | nascar.xml |
| 195 | Major League Soccer | mls.xml |

A uniform resource locator (URL) for retrieving the XML data feeds follows the format below with the CategoryID different for each sport or sport grouping.

```
<FeedFilesSet>
  <FileSpec>
    <DataFile>mlb.xml</DataFile>
    <DataUrl>gsf?partnerKey=76p5TaampnM&categoryId=49</DataUrl>
    <DataFileType>Single</DataFileType>
    <NewDataDetectionType>CreationTime</NewDataDetectionType>
  </FileSpec>
  <FileSpec>
    <DataFile>nba.xml</DataFile>
    <DataUrl>gsf?partnerKey=76p5TaampnM&categoryId=73</DataUrl>
    <DataFileType>Single</DataFileType>
    <NewDataDetectionType>CreationTime</NewDataDetectionType>
  </FileSpec>
</FeedFilesSet>
```

Exemplary, collected GSF XML is validated against a GSF extensible schema definition (XSD) such as shown below.

```
<?xml version="1.0" encoding="UTF-8"?>
<SportsSchedules>
  <Schedule GenDate="2005-05-11T18:37:43" League="MLB" LeagueId="49"
  Season="2005" Sport="Baseball" LeagueDisplayName="MLB">
    <Game TBA="false" Type="Regular" StartDateTime=
    "2005-05-11T16:35:00"
    Title="World Series Game 2" ID="250511117">
      <Location Name="Great American Ballpark" City="Cincinnati"
      State="Ohio" ID="83"/>
      <TV>
        <Station Affiliation="Comcast Philadelphia" CallLetter=
        "WKBD"/>
        <Station Affiliation="Comcast Boston" CallLetter=
        "WDIV"/>
      </TV>
      <HomeTeam Abbreviation="CIN" FullName="Cincinnati Reds"
      ShortName="Reds" City="Cincinnati" NickName="Reds" ID="17"
      Conference="NL"/>
      <VisitingTeam Abbreviation="SD" FullName="San Diego Padres"
      ShortName="Padres" City="San Diego" NickName="Padres" ID="25"
      Conference="NL"/>
    </Game>
  </Schedule>
</SportsSchedules>
```

The in-season data 108 is used to validate the collected GSF. For example, if the GSF for an in-season league has no games, an error occurs and is logged. The in-season data 108 is also validated against an XSD such as shown below.

```
<?xml version="1.0" encoding="UTF-8"?>
<SeasonSchedule>
  <League ID="49">
    <Name>MLB</Name>
    <DisplayName>MLB</DisplayName>
    <StartDate>2005-04-02 12:00:00Z</StartDate>
    <EndDate>2005-10-31 12:00:00Z</EndDate>
  </League>
  <League ID="5">
    <Name>NFL</Name>
    <DisplayName>NFL</DisplayName>
    <StartDate>2005-9-8 12:00:00Z</StartDate>
    <EndDate>2006-2-13 12:00:00Z</EndDate>
  </League>
</SeasonSchedule>
```

In one embodiment, the override data 110 exists for each league. In other embodiments, no override data 110 exists. Exemplary XML representing the override data 110 appears as shown below and is validated against an XSD. Any association that has an ExpirationDate after the current date is ignored at load time.

```
<?xml version="1.0" encoding="UTF-8"?>
<Override>
    <League LeagueId="49" League="MLB">
        <Associate GameId="250511117" ProgramId="456812" ExpirationDate="2005-05-11" />
        <Associate GameId="250511119" ProgramId="456813" ExpirationDate="2005-05-13" />
    </League>
</Override>
```

An embodiment of the invention includes a set of match rules 112 or criteria for each league in the sports schedule data 104. These rules 112 are used to identify the corresponding television programs for sporting events in that league or category. Each set of rules 112 may be stored in a separate file. The rules 112 may be received as XML as shown in Appendix B, validated against an XSD.

Figure 2:
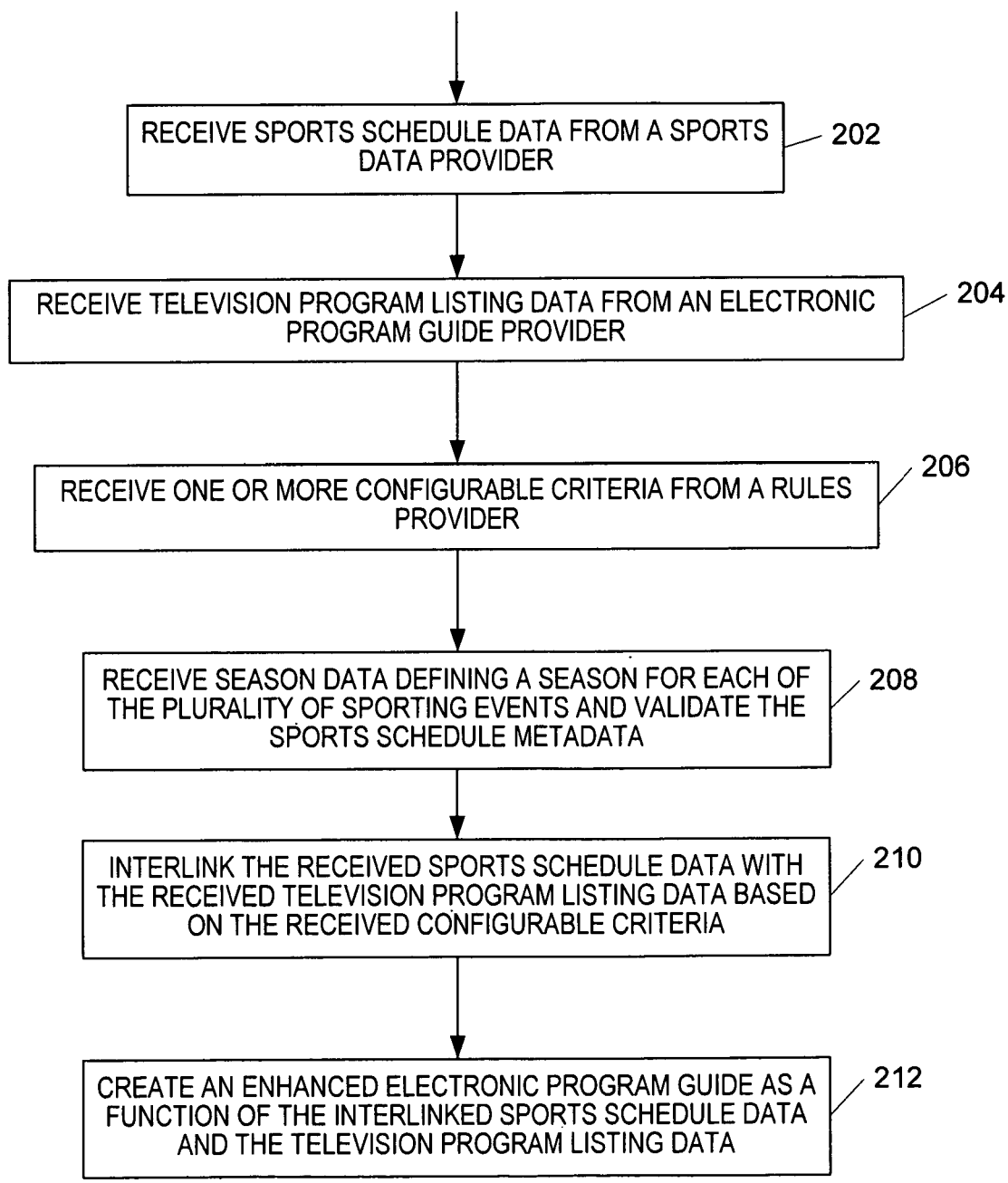
FIG. 2 is an exemplary flow chart illustrating creation of an enhanced electronic programming guide.

Referring next to FIG. 2, an exemplary flow chart illustrates creation of an enhanced electronic programming guide. In the example of FIG. 2, sports schedule data including metadata for a plurality of sporting events is received from a sports data provider at 202. For example, the metadata may include a title, a description, a start time, an end time, and a duration of the sporting events in one or more leagues. The sports schedule data may be validated by comparing the sports scheduled data against season data that defines a season for each of the plurality of sporting events.

Television program listing data is received from an electronic programming guide provider at 204. The television program listing data includes television program listings corresponding to at least one of the plurality of sporting events. A rules provider provides one or more configurable criteria defining characteristics of the sporting events at 206. The characteristics of the sporting events are particular to each type of sporting event, game, or league and include, for example, team names. At 208, the method in FIG. 2 receives season data defining a season for each of the plurality of sporting events and validates the sports schedule metadata with the received season data. Embodiments of the invention interlink the sports schedule data with the television program listing data based on the received configurable criteria at 210 and create an enhanced electronic programming guide as a function thereof at 212. Interlinking the sports schedule data with the television program listing data includes querying the television program listing data for candidate program listings based on the configurable criteria and matching the candidate program listings to the metadata in the sports schedule data.

In one embodiment, the interlinking process includes performing fuzzy string comparisons. In one example, the television program listing data includes an episode title and reduced description for each of the program listings. In this example, interlinking the received sports schedule data with the received television program listing data includes comparing the title in the sports schedule data with the episode title in the television program listing data and comparing the description in the sports schedule data with the reduced description in the television program listing data.

The method in FIG. 2 further receives override data identifying a portion of the sports schedule data and a corresponding program listing in the television program listing data. The override data manually and explicitly pairs sporting events with television program listings.

Alternatively or in addition, the method illustrated in FIG. 2 may interlink, merge, or otherwise combine sports schedule data from multiple sports providers before matching the merged metadata with the television program listing data. For example, additional sports schedule data may be received from another sports data provider and interlinked with the sports schedule data previously received. Such merging enables the use of additional sports data providers to expand the quality and quantity of metadata for each sporting event.

In one embodiment, one or more computer-readable media have computer-executable instructions for performing the computerized method illustrated in FIG. 2 and the following method: querying the television program listing data based on the configurable match rules for each of the plurality of sporting events; identifying, from the queried television program listing data, one or more television program listings corresponding to each of the sporting events; merging the metadata for the plurality of sporting events with the television program listing data for the identified television program listings; and updating the electronic programming guide with the merged metadata.

Figure 3:
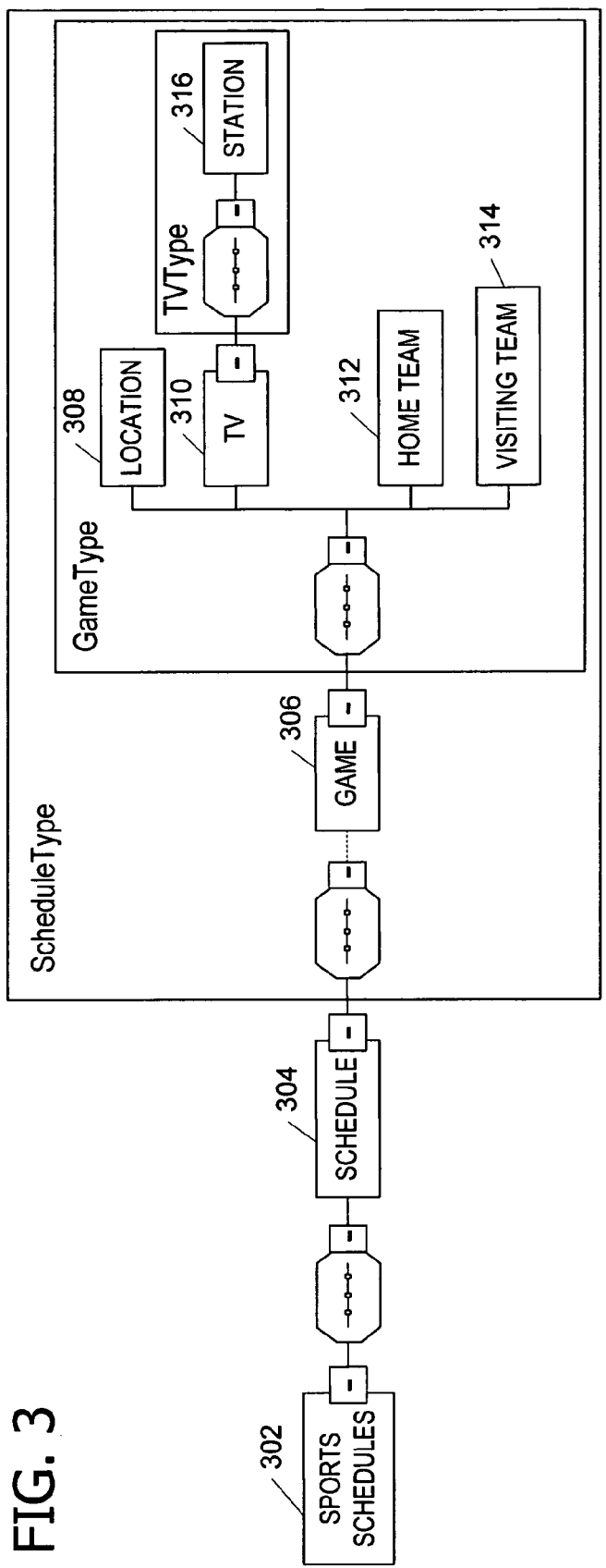
FIG. 3 is an exemplary block diagram illustrating sports schedule data in an implementation of the global sports format.

Referring next to FIG. 3, an exemplary block diagram illustrates sports schedule data in an implementation of the global sports format. In the example of FIG. 3, the sports schedules 302 comprise a schedule 304 for each league. Each schedule describes at least one game 306 (in a ScheduleType data structure). For each game 306, metadata describes the location 308, television station (TV 310), home team 312, and visiting team 314 in a GameType data structure. TV 310 defines the local affiliate station 316 in a TVType data structure.

Figure 4B:
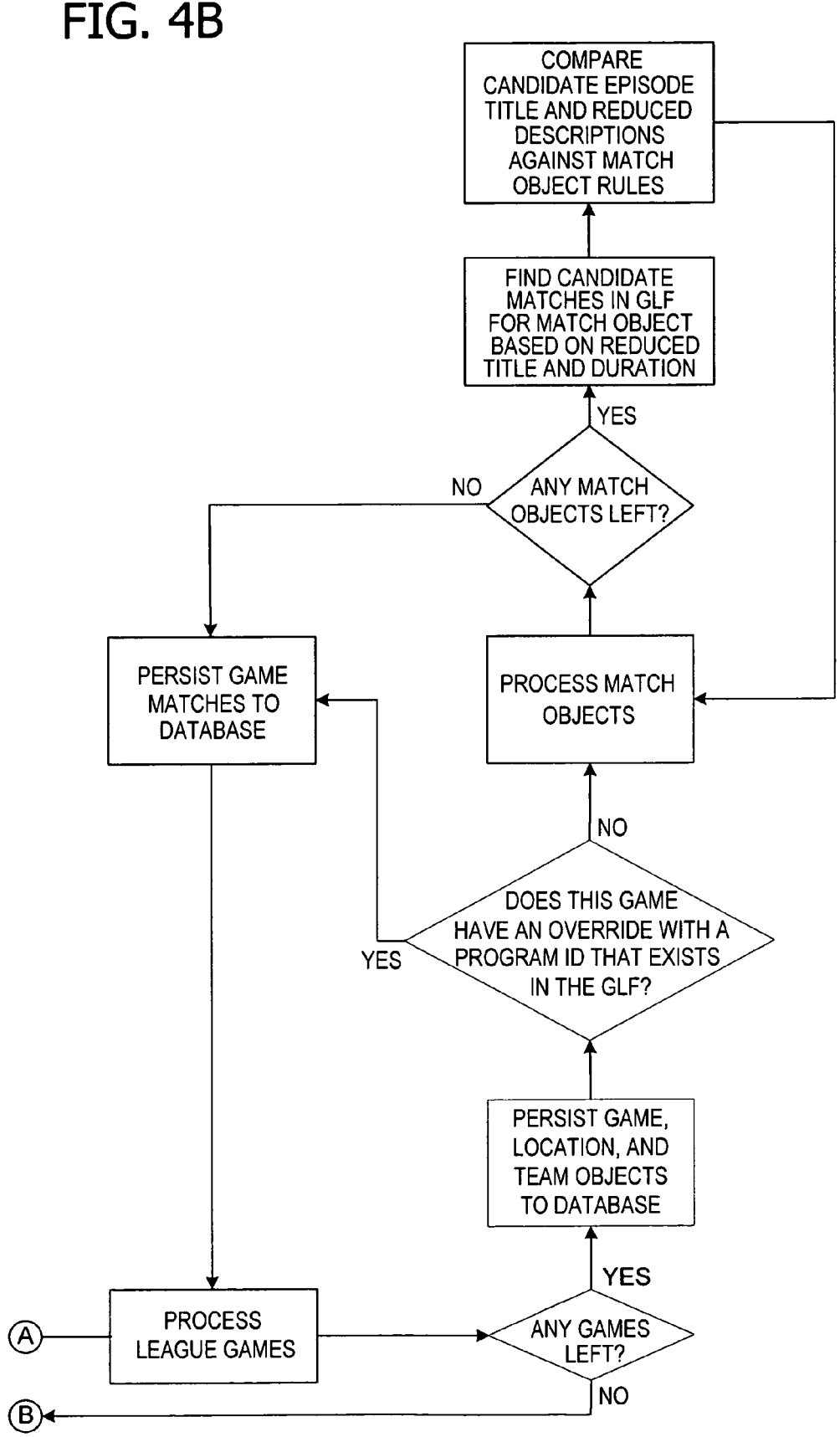
FIG. 4 is an exemplary flow chart illustrating interlinking of sports schedule data and television program listing metadata.

Referring next to FIG. 4, an exemplary flow chart illustrates interlinking of sports schedule data and television program listing metadata. In one embodiment, matching occurs in the following manner: via a match override defined in the override data, and via a match based on episode title and reduced description from the match rules. If one or more valid overrides exist for a game, those valid associations will simply be written out with no additional checking. Valid override data includes override data that has an expiration date within a particular window of time relative to the television program listing data. If no valid overrides exist for a game, potential matches are located using the match rules. For each match rule, a set of candidate matches is selected from the database using the criteria such as shown below.

```
<Match Name="English" Confidence="100" StartTimeBefore="40" StartTimeAfter="5"
DurationMinimum="150" DurationMaximum="240">
    <ReducedTitle>MLB Baseball</ReducedTitle>
    <ReducedTitle>Beisbol de las Grandes Ligas</ReducedTitle>
```

In the above example, candidate matches include those television program listings that start within a window of time centered around the event start date and time from the sport schedule data, that have a duration greater than or equal the minimum specified and less than or equal the maximum specified (in minutes), and that match one of the supplied reduced titles. If an excessive number of candidate matches is returned, a warning is logged and additional candidate matches are ignored.

For each match set, multiple episode title templates (such as shown below) are defined and one or more team names may be mapped to each team identifier. If any candidate matches have been identified, a set of valid episode titles is generated by substituting the appropriate team names or title provided by the sports provider for tokens in configured episode title templates. If a token does not have valid corresponding data in the sports feed, that episode title template is skipped.

```
<EpisodeTitle TeamSet="English" Fuzziness="80">@{VisitingTeam}
en @{HomeTeam}</EpisodeTitle> <!- team tokens →
<EpisodeTitle Fuzziness="60">@{Title}</EpisodeTitle> <!-title token →
<EpisodeTitle IsRegex="true">Teams TBA$</EpisodeTitle> <!- regex →
<EpisodeTitle>@{NULL}</EpisodeTitle> <!- special token to match
NULL title →
```

The method iterates over the candidates matches and compares each candidate episode title against each of the episode titles generated from the templates. An exact match or a regular expression match has a score of 100, in one embodiment. If there is no exact match and a fuzziness threshold is configured at less than 100, a fuzzy matching score is calculated on a 0-100 scale. The algorithm for calculating the fuzzy matching score uses, in one embodiment, a combination of Levenshtein edit distance and common word comparison between the two strings. If the fuzzy matching score exceeds the configured threshold, a match is made between the game and that program. Fuzzy string matching allows for small differences when doing string comparisons. Appendix C includes an exemplary implementation of the fuzzy match operations.

If an optional ReducedDescription template (such as shown below) is defined in the match rules, a similar process is applied to the description templates and the reduced description of the programs. Both the reduced description and the episode title match should exceed the threshold for a match to be made.

```
<ReducedDescription Fuzziness="60">From @{Location.Name} in @
{Location.City}, @
{Location.State}</ReducedDescription>
```

After the matching operations have been performed, data for the enhanced electronic programming guide is stored as XML validated against an XSD as shown below. Any matches with a confidence level below a particular threshold are not included in the output.

```
<?xml version="1.0" ?>
<MXF version="1.0">
    <Assembly name="mcstore">
        <NameSpace name="Microsoft.MediaCenter.Store">
            <Type name="Provider" />
            <Type name="UId" parentFieldName="target" />
        </NameSpace>
    </Assembly>
    <Assembly name="Microsoft.MediaCenter.Sports">
        <NameSpace name="MediaCenter.Sports.Data">
            <Type name="League" />
            <Type name="Team" />
            <Type name="SportingEvent" />
            <Type name="ProgramMatch" />
        </NameSpace>
    </Assembly>
    <!-- Provider Type -->
    <Provider id="1" description="foxsports">
        <UId>!Microsoft.WMIS.Sports.Provider!1</UId>
    </Provider>
    <!-- League Type -->
    <League id="13" provider="1" leagueId="49" name="MLB"
displayName="MLB">
        <UId>!Microsoft.WMIS.Sports.League!1:49</UId>
    </League>
    <League id="14" provider="1" leagueId="195" name="MLS"
displayName="MLS">
        <UId>!Microsoft.WMIS.Sports.League!1:195</UId>
    </League>
    <!-- Team type -->
    <Team id="30" league="10" teamId="9" name="New England"
fullName="New England Revolution" alias="NE" nickName=
"Revolution" city="New England" abbreviation="REVS">
        <UId>!Microsoft.WMIS.Sports.Team!1:195:9</UId>
    </Team>
    <Team id="31" league="13" teamId="1" name="Orioles"
fullName="Baltimore Orioles" alias="BAL" nickName="Orioles"
city="Baltimore" abbreviation="BAL">
        <UId>!Microsoft.WMIS.Sports.Team!1:49:1</UId>
    </Team>
    <!-- SportingEvent type -->
    <SportingEvent id="106" league="4" eventId="20050807012"
eventStart="2005-08-07T18:40:00" title="Allstate 400 at the Brickyard">
        <UId>!Microsoft.WMIS.Sports.SportingEvent!1:168:20050807012</
UId>
    </SportingEvent>
    <SportingEvent id="163" league="13" away="32" home="36"
eventId="250805114" eventStart="2005-08-05T23:07:00">
        <UId>!Microsoft.WMIS.Sports.SportingEvent!1:49:250805114</
UId>
    </SportingEvent>
    <!-- ProgramMatch type -->
    <ProgramMatch id="758" sportingEvent="191" programId=
"SP1682020000" confidence="100">
        <UId>!Microsoft.WMIS.Sports.ProgramMatch!1:49:250807109:Full
Team Matching:SP1682020000</UId>
    </ProgramMatch>
    <ProgramMatch id="756" sportingEvent="189" programId=
"SP1681980000" confidence="100">
        <UId>!Microsoft.WMIS.Sports.ProgramMatch!1:49:250807106:Full
Team Matching:SP1681980000</UId>
    </ProgramMatch>
```

In one embodiment, processing occurs via a C# IProcess that expects the following parameters. In the example below, data is received from only one sports data provider. Receiving data from multiple sports data providers, however, is within the scope of the invention.

```
<Parameter name="providers">XYZsports</Parameter>
<Parameter name="glf_pvid">10</Parameter>
<!-- minimum confidence score to include in schedule mxf -->
<Parameter name="min_confidence">25</Parameter>
<!-- list of filters for PDS manifest -->
<Parameter name="filter_CountryCode">US,CA</Parameter>
<!-- XYZsports -->
<Parameter name="XYZsports_provider_id">1</Parameter>
<Parameter name="XYZsports_files_to_process">mlb nba</Parameter>
<RefParameter appName="dcs_XYZsports" attribute="WorkingDir"
variable="XYZsports_dcs_workdir" />
<RefParameter appName="dcs_XYZsports_rules" attribute=
"WorkingDir"
variable="XYZsports_rules_dcs_workdir" />
<RefParameter appName="dcs_XYZsports_override"
attribute="WorkingDir" variable="XYZsports_override_dcs_workdir"
/>
<RefParameter appName="PipelineStage" attribute="Database/Server"
variable="dps_sports_server" />
<RefParameter appName="PipelineStage" attribute="Database/@name"
variable="dps_sports_db" />
<RefParameter appName="dps_sports_usca" attribute="WorkingDir"
variable="workdir" />
```

Exemplary Operating Environment

An exemplary operating environment in one embodiment of the invention includes a general purpose computing device such as a computer executing computer-executable instructions. The computing device typically has at least some form of computer readable media (e.g., a memory area). Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. The user may enter commands and information into the computing device through input devices or user interface selection devices such as a keyboard and a pointing device (e.g., a mouse, trackball, pen, or touch pad). Other input devices (not shown) may be connected to the computing device. The computing device may operate in a networked environment using logical connections to one or more remote computers.

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, a computing device executes computer-executable instructions such as those illustrated in the figures to implement aspects of the invention.

The following examples further illustrate embodiments of the invention. Hardware, software, firmware, computer-executable components, computer-executable instructions, and/or the elements of FIGS. 1-5 constitute computerized means for storing sports schedule data in a global sports format and computerized means for interlinking sporting event metadata and television program listing metadata.

Figure 5:
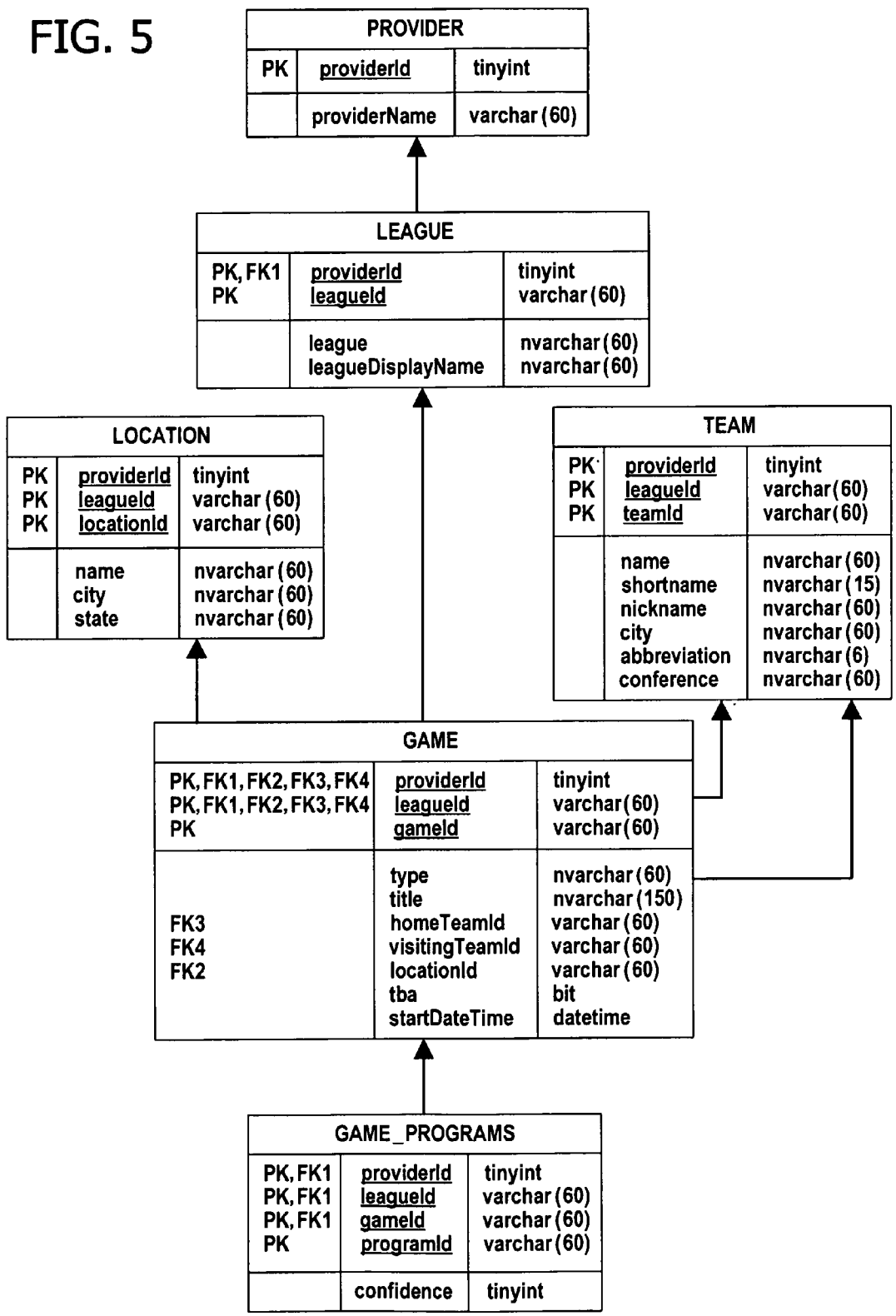
FIG. 5 is a block diagram illustrating an exemplary schema for the global sports format data feed.

Referring next to FIG. 5, a block diagram illustrates an exemplary schema for the global sports format data feed. The data is stored according to the schema in a data structure including a league field storing a league identifier and a game field storing a game identifier and start date value and a start time value associated therewith. Additional fields include a team sports field storing a home team identifier, a visiting team identifier, and an event name associated with the game identifier. In one embodiment, the game field further stores a geographic location identifier storing a value associated with the game identifier. In another embodiment, the geographic location identifier is stored as a separate field.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

The XML below represents an exemplary implementation of the global sports format data feed schema.

```
<?xml version="1.0"?>
<xsd:schema xmlns:xsd="http://www.w3.org/2001/XMLSchema">
```

```
<xsd:annotation>
    <xsd:documentation>Copyright 2005 Microsoft Corporation. All
rights reserved. Global Sports Format Data Feed XML Schema Version
0.3</xsd:documentation>
</xsd:annotation>
<!-- root schedule node -->
<xsd:element name="SportsSchedules">
    <xsd:annotation>
        <xsd:documentation>Base element for transmitting sports
schedule data</xsd:documentation>
    </xsd:annotation>
    <xsd:complexType>
        <xsd:sequence>
            <xsd:element name="Schedule" type="ScheduleType"
maxOccurs="unbounded">
                <xsd:annotation>
                    <xsd:documentation>One Schedule entry
for each league</xsd:documentation>
                </xsd:annotation>
            </xsd:element>
        </xsd:sequence>
    </xsd:complexType>
</xsd:element>
<!-- schedule -->
<xsd:complexType name="ScheduleType">
    <xsd:sequence>
        <xsd:element name="Game" type="GameType" minOccurs="0"
maxOccurs="unbounded"/>
    </xsd:sequence>
    <xsd:attribute name="GenDate" type="xsd:dateTime"
use="required">
        <xsd:annotation>
            <xsd:documentation>The date the document was last
updated</xsd:documentation>
        </xsd:annotation>
    </xsd:attribute>
    <xsd:attribute name="Sport" type="MediumString" use="required">
        <xsd:annotation>
            <xsd:documentation>This is a high level sport type,
like basketball, football, golf</xsd:documentation>
        </xsd:annotation>
    </xsd:attribute>
    <xsd:attribute name="LeagueId" type="MediumString"
use="required">
        <xsd:annotation>
            <xsd:documentation>Id for league, unique per
provider</xsd:documentation>
        </xsd:annotation>
    </xsd:attribute>
    <xsd:attribute name="League" type="MediumString"
use="required">
        <xsd:annotation>
            <xsd:documentation>Unique league
name</xsd:documentation>
        </xsd:annotation>
    </xsd:attribute>
    <xsd:attribute name="LeagueDisplayName" type="MediumString"
use="required">
        <xsd:annotation>
            <xsd:documentation>Short league name to use for
display</xsd:documentation>
        </xsd:annotation>
    </xsd:attribute>
    <xsd:attribute name="Season" type="YearType" use="required">
        <xsd:annotation>
            <xsd:documentation>4 digit season year, use lower
year for sports that span years</xsd:documentation>
        </xsd:annotation>
    </xsd:attribute>
</xsd:complexType>
<!-- game -->
<xsd:complexType name="GameType">
    <xsd:annotation>
        <xsd:documentation>There is a single game for each
event</xsd:documentation>
    </xsd:annotation>
    <xsd:sequence>
        <xsd:element name="Location" type="LocationType"
minOccurs="0"/>
        <xsd:element name="TV" type="TVType" minOccurs="0"/>
        <!-- minOccurs could be 1 for team sports -->
        <xsd:element name="HomeTeam" type="TeamType"
minOccurs="0"/>
        <xsd:element name="VisitingTeam" type="TeamType"
minOccurs="0"/>
    </xsd:sequence>
    <xsd:attribute name="ID" type="MediumString" use="required">
        <xsd:annotation>
            <xsd:documentation>Id that corresponds to this
event, unique within a league and provider</xsd:documentation>
        </xsd:annotation>
    </xsd:attribute>
    <xsd:attribute name="StartDateTime" type="xsd:dateTime"
use="required">
        <xsd:annotation>
            <xsd:documentation>Starting date and time of the
event</xsd:documentation>
        </xsd:annotation>
    </xsd:attribute>
    <xsd:attribute name="Type" type="MediumString" use="optional">
        <xsd:annotation>
            <xsd:documentation>Event type, ie. regular,
playoffs, preseason</xsd:documentation>
        </xsd:annotation>
    </xsd:attribute>
    <xsd:attribute name="TBA" type="xsd:boolean" use="required">
        <xsd:annotation>
            <xsd:documentation>Are the teams to be
announced?</xsd:documentation>
        </xsd:annotation>
    </xsd:attribute>
    <xsd:attribute name="Title" type="LongString" use="optional">
        <xsd:annotation>
            <xsd:documentation>Title of the event, especially
for non team sports</xsd:documentation>
        </xsd:annotation>
    </xsd:attribute>
    <!-- title could be required for non-team sports -->
</xsd:complexType>
<!-- location -->
<xsd:complexType name="LocationType">
    <xsd:annotation>
        <xsd:documentation>Location type for event, ie. stadium,
track, etc</xsd:documentation>
    </xsd:annotation>
    <xsd:attribute name="ID" type="MediumString" use="required">
        <xsd:annotation>
            <xsd:documentation>A unique id within the provider
and league for event location</xsd:documentation>
        </xsd:annotation>
    </xsd:attribute>
    <xsd:attribute name="Name" type="MediumString" use="required">
        <xsd:annotation>
            <xsd:documentation>Name of the
location</xsd:documentation>
        </xsd:annotation>
    </xsd:attribute>
    <xsd:attribute name="City" type="MediumString" use="required">
        <xsd:annotation>
            <xsd:documentation>City of the
location</xsd:documentation>
        </xsd:annotation>
    </xsd:attribute>
    <xsd:attribute name="State" type="MediumString" use="required">
        <xsd:annotation>
            <xsd:documentation>State of the
location</xsd:documentation>
        </xsd:annotation>
    </xsd:attribute>
</xsd:complexType>
<!-- team type -->
<xsd:complexType name="TeamType">
    <xsd:annotation>
        <xsd:documentation>Team type</xsd:documentation>
    </xsd:annotation>
    <xsd:attribute name="ID" type="MediumString" use="required">
        <xsd:annotation>
            <xsd:documentation>Unique id within a league for
```

-continued

```
this team</xsd:documentation>
        </xsd:annotation>
      </xsd:attribute>
      <xsd:attribute name="FullName" type="MediumString"
use="required">
        <xsd:annotation>
          <xsd:documentation>this will be the concatenation
of the Name and the NickName. will generally include the location and the
mascot except in situations where there is no mascot.</
xsd:documentation>
        </xsd:annotation>
      </xsd:attribute>
      <xsd:attribute name="Name" type="MediumString" use="required">
        <xsd:annotation>
          <xsd:documentation>this will uniquely identify the
team for longer display purposes for the league. in the case of
professional leagues this is almost always nickname. in the case of college
teams this is always name of the college.</xsd:documentation>
        </xsd:annotation>
      </xsd:attribute>
      <xsd:attribute name="NickName" type="MediumString"
use="required">
        <xsd:annotation>
          <xsd:documentation>this is always the
nickname/mascot. Will be empty if the Name attribute also contains the
mascot (D.C. United, Metrostars) or the team doesn't have a
nickname (FC
Dallas, Chivas USA) </xsd:documentation>
        </xsd:annotation>
      </xsd:attribute>
      <xsd:attribute name="City" type="MediumString" use="required">
        <xsd:annotation>
          <xsd:documentation>location of the team, usually a
city, sometimes a state</xsd:documentation>
        </xsd:annotation>
      </xsd:attribute>
      <xsd:attribute name="Abbreviation" type="AbbreviationString"
use="required">
        <xsd:annotation>
          <xsd:documentation>scoreboard friendly abbreviation
(always less than 8 characters) </xsd:documentation>
        </xsd:annotation>
      </xsd:attribute>
      <xsd:attribute name="Alias" type="AliasString" use="required">
        <xsd:annotation>
          <xsd:documentation>short scoreboard friendly
abbreviation (always less than 6 characters) - this will often be the same
as abbreviation</xsd:documentation>
        </xsd:annotation>
      </xsd:attribute>
      <xsd:attribute name="Conference" type="MediumString"
use="optional">
        <xsd:annotation>
          <xsd:documentation>Conference for a
team</xsd:documentation>
        </xsd:annotation>
      </xsd:attribute>
    </xsd:complexType>
    <!-- tv -->
    <xsd:complexType name="TVType">
      <xsd:annotation>
        <xsd:documentation>List of TV Stations that air this
event</xsd:documentation>
      </xsd:annotation>
      <xsd:sequence>
        <xsd:element name="Station" type="StationType"
maxOccurs="unbounded"/>
      </xsd:sequence>
    </xsd:complexType>
    <!-- station -->
    <xsd:complexType name="StationType">
      <xsd:annotation>
        <xsd:documentation>TV Station
information</xsd:documentation>
        <xsd:documentation>Call Letters for station, ie ABC,
ESPN</xsd:documentation>
        <xsd:documentation>Affiliation for
station</xsd:documentation>
      </xsd:annotation>
      <xsd:attribute name="CallLetter" type="MediumString"
use="required"/>
      <xsd:attribute name="Affiliation" type="MediumString"
use="required"/>
    </xsd:complexType>
    <!-- extended simple types -->
    <xsd:simpleType name="YearType">
      <xsd:restriction base="xsd:integer">
        <xsd:minInclusive value="2004"/>
        <xsd:maxInclusive value="9999"/>
      </xsd:restriction>
    </xsd:simpleType>
    <xsd:simpleType name="LongString">
      <xsd:restriction base="xsd:string">
        <xsd:minLength value="0"/>
        <xsd:maxLength value="150"/>
      </xsd:restriction>
    </xsd:simpleType>
    <xsd:simpleType name="MediumString">
      <xsd:restriction base="xsd:string">
        <xsd:minLength value="0"/>
        <xsd:maxLength value="60"/>
      </xsd:restriction>
    </xsd:simpleType>
    <xsd:simpleType name="ShortString">
      <xsd:restriction base="xsd:string">
        <xsd:minLength value="1"/>
        <xsd:maxLength value="15"/>
      </xsd:restriction>
    </xsd:simpleType>
    <xsd:simpleType name="AbbreviationString">
      <xsd:restriction base="xsd:string">
        <xsd:minLength value="0"/>
        <xsd:maxLength value="8"/>
      </xsd:restriction>
    </xsd:simpleType>
    <xsd:simpleType name="AliasString">
      <xsd:restriction base="xsd:string">
        <xsd:minLength value="0"/>
        <xsd:maxLength value="6"/>
      </xsd:restriction>
    </xsd:simpleType>
</xsd:schema>
```

Appendix B

Exemplary match rules are shown below. In one embodiment, the match rules comprise location-specific criteria, or other geographical criteria. The starttimebefore and starttimeafter fields define an acceptable number of minutes on either side of the game to allow for game delays, etc. The durationmaximum and durationminimum fields define an acceptable number of minutes for the duration of a television program. In one embodiment, the match rules include multiple TeamSet fields, one for each supported language.

```
<?xml version="1.0" encoding="UTF-8"?>
<Matches>
  <MatchLeague LeagueId="49" League="MLB">
    <Match Name="English"
        Confidence="100"
        StartTimeBefore="40"
        StartTimeAfter="5"
        DurationMinimum="150"
        DurationMaximum="240">
      <ReducedTitle>MLB Baseball</ReducedTitle>
      <EpisodeTitle TeamSet="English"
Fuzziness="80">@{VisitingTeam} at @{HomeTeam}</EpisodeTitle>
    </Match>
    <Match Name="Spanish"
        Confidence="95"
```

-continued

```
            StartTimeBefore="40"
            StartTimeAfter="5"
            DurationMinimum="150"
            DurationMaximum="240">
        <ReducedTitle>BÃ©isbol de las Grandes
Ligas</ReducedTitle>
        <EpisodeTitle TeamSet="English"
Fuzziness="80">@{VisitingTeam} en @{HomeTeam}</EpisodeTitle>
        <EpisodeTitle TeamSet="English"
Fuzziness="80">@{VisitingTeam} a @{HomeTeam}</EpisodeTitle>
    </Match>
    <Match Name="French"
            Confidence="95"
            StartTimeBefore="40"
            StartTimeAfter="5"
            DurationMinimum="150"
            DurationMaximum="240">
        <ReducedTitle>Baseball des ligues
majeures</ReducedTitle>
        <EpisodeTitle TeamSet="French"
Fuzziness="80">@{VisitingTeam} rencontrent
@{HomeTeam}</EpisodeTitle>
    </Match>
    <Match Name="Null Title"
            Confidence="50"
            StartTimeBefore="20"
            StartTimeAfter="0"
            DurationMinimum="150"
            DurationMaximum="240"
            OneMatch="true">
        <ReducedTitle>MLB Baseball</ReducedTitle>
        <EpisodeTitle>@{NULL}</EpisodeTitle>
    </Match>
    <Match Name="Teams TBA" Confidence="40"
            StartTimeBefore="20"
            StartTimeAfter="0"
            DurationMinimum="150"
            DurationMaximum="240"
            OneMatch="true">
        <ReducedTitle>MLB Baseball</ReducedTitle>
        <EpisodeTitle IsRegex="true">Teams TBA</EpisodeTitle>
    </Match>
    <TeamSet Name="English">
        <Team id="1"><Name>Baltimore Orioles</Name></Team>
        <Team id="2"><Name>Boston Red Sox</Name></Team>
        <Team id="3">
            <Name>Los Angeles Angels</Name>
            <Name>Los Angeles Angels of Anaheim</Name>
        </Team>
        <Team id="4"><Name>Chicago White Sox</Name></Team>
        <Team id="5"><Name>Cleveland Indians</Name></Team>
        <Team id="6"><Name>Detroit Tigers</Name></Team>
        <Team id="7"><Name>Kansas City Royals</Name></Team>
        <Team id="8"><Name>Milwaukee Brewers</Name></Team>
        <Team id="9"><Name>Minnesota Twins</Name></Team>
        <Team id="10"><Name>New York Yankees</Name></Team>
        <Team id="11">
            <Name>Oakland Athletics</Name>
            <Name>Oakland A's</Name>
        </Team>
        <Team id="12"><Name>Seattle Mariners</Name></Team>
        <Team id="13"><Name>Texas Rangers</Name></Team>
        <Team id="14"><Name>Toronto Blue Jays</Name></Team>
        <Team id="15"><Name>Atlanta Braves</Name></Team>
        <Team id="16"><Name>Chicago Cubs</Name></Team>
        <Team id="17"><Name>Cincinnati Reds</Name></Team>
        <Team id="18"><Name>Houston Astros</Name></Team>
        <Team id="19"><Name>Los Angeles Dodgers</Name></Team>
        <Team id="20"><Name>Washington Nationals</Name></Team>
        <Team id="21"><Name>New York Mets</Name></Team>
        <Team id="22"><Name>Philadelphia Phillies</Name></Team>
        <Team id="23"><Name>Pittsburgh Pirates</Name></Team>
        <Team id="24"><Name>St. Louis Cardinals</Name></Team>
        <Team id="25"><Name>San Diego Padres</Name></Team>
        <Team id="26"><Name>San Francisco Giants</Name></Team>
        <Team id="27"><Name>Colorado Rockies</Name></Team>
        <Team id="28"><Name>Florida Marlins</Name></Team>
        <Team id="29"><Name>Arizona Diamondbacks</Name></Team>
        <Team id="30"><Name>Tampa Bay Devil Rays</Name></Team>
    </TeamSet>
    <TeamSet Name="French">
        <Team id="15"><Name>les Braves d'Atlanta</Name></Team>
        <Team id="22"><Name>les Phillies a
Philadelphie</Name></Team>
        <Team id="11"><Name>les A's d'Oakland</Name></Team>
        <Team id="26"><Name>les Giants Ã San
Francisco</Name></Team>
    </TeamSet>
</MatchLeague>
</Matches>
Or for events that we want to compare the description as
well:
<MatchLeague LeagueId="168" League="Cup">
    <Match Name="English"
            Confidence="100"
            DurationMinimum="90"
            DurationMaximum="300"
            StartTimeBefore="60"
            StartTimeAfter="0"
    >
        <ReducedTitle>Nascar Racing</ReducedTitle>
        <EpisodeTitle Fuzziness="60">Nextel Cup
@{Title}</EpisodeTitle>
        <EpisodeTitle Fuzziness="60">@{Title}</EpisodeTitle>
        <ReducedDescription Fuzziness="60">From @{Location.Name}
in @{Location.City}, @{Location.State}</ReducedDescription>
    </Match>
</MatchLeague>
```

Appendix C

An exemplary fuzzy string comparison algorithm computes the similarity of two strings on a 0-100 scale. Exemplary operations are shown below.

Operation 1—Clean the characters in both strings removing punctuation, standardizing case, and removing extraneous white space.
String1: "PGA Tour Championship: First Round"
Cleaned: "pga tour championship first round"
String2: "PGA: Tour Champs—First Round Action"
Cleaned: "pga tour champs first round action"

Operation 2—Compute the Levenshtein (or edit) distance, and the maximum Levenshtein distance between each pair of words in the two strings (using the equal weight of 1 for edit, insert, and delete). The score for each word comparison in the table below then is:
(max distance—Levenshtein distance)/max distance

TABLE C1

Score for Each Word Comparison.

| string 1 below | pga | tour | champs | first | round | action | Best |
|---|---|---|---|---|---|---|---|
| pga | 3/3 | 0/4 | 1/6 | 0/5 | 0/5 | 0/6 | 3/3 |
| tour | 0/4 | 4/4 | 0/6 | 0/5 | 2/5 | 1/6 | 4/4 |
| championship | 1/12 | 0/12 | 6/12 | 2/12 | 1/12 | 4/12 | 6/12 |
| first | 0/5 | 0/5 | 0/6 | 5/5 | 0/5 | 0/6 | 5/5 |
| round | 0/5 | 2/5 | 0/6 | 0/5 | 5/5 | 0/6 | 5/5 |

Operation 3—For each word in string 1 compute the best value is the score with highest numerator. The final score is simply the sum of numerators in the best column divided by the sum of denominators. In this example, 23/29 as a percentage—79%.

Operation 4—To handle the case where words are repeated in either (but not both) of the strings (e.g., "girls, girls, girls" and "the girls"), we will access a penalty multiplier to the score from Step 3 in the case where more than one word from string 1 is mapped to a single word in string 2 and the score in the mapping is 2 or less below the maximum distance (e.g., 6/8, 7/8, 8/8 are in, 5/8 and below are out). For each double mapped word multiple the score by 0.93, for each unmapped word multiple the score by 0.98.

Operation 5 (optional, to improve results)—Average the score comparing string 1 to string 2, and string 2 to string 1.

Operation 6 (optional)—Additionally for languages that do not have word divisions or where word divisions are ambiguous you can also compare the entire cleaned versions of string 1 and string 2 using Levenshtein distance (and maximum Levenshtein distance). If that score is higher than the score computed comparing the words—then use that score instead.

The following data is calculated and stored in summary tables, or may be easily queried from the final database.

1. Sports interlinking rate summary report
   No. of sporting events that cannot be matched against television program listings by league
   No. of sporting events that has been matched against television program listings by league
   No. of television program listing sporting events that cannot be matched against the sports schedule data by league
   No. of television program listing sporting events that can be matched against sports schedule data by league
2. Sports interlinking detailed report
   A list of sports schedule data sporting events that cannot be matched against television program listing data
      By league
      By confidence score
   A list of sports schedule data sporting events that has been matched against television program listing data with the override data
      By league
      By confidence score
   A list of sports schedule data sporting events that has been matched against television program listing data without the override data
      By league
      By confidence score

What is claimed is:

1. A computerized method of interlinking sporting event metadata and television program listing metadata, said computerized method comprising:
   storing sports schedule data in a memory area, said sports schedule data from a sports data provider, said sports schedule data representative of an event schedule for a particular sports league, said sports schedule data comprising metadata for a plurality of sporting events of the particular sports league, said metadata including a scheduled time for each of the plurality of sporting events;
   identifying the scheduled times included within the received metadata;
   receiving television program listing data from an electronic programming guide provider, said television program listing data comprising television program listings corresponding to at least one of the plurality of sporting events, said television program listings including program delivery times;
   identifying via a processor the delivery times included within the received television program listings;
   receiving, from a rules provider, one or more configurable criteria for characteristics of the sporting events, said characteristics of the sporting events including the scheduled time for each of said sporting events;
   identifying via the processor one or more candidate television program listings based on the received configurable criteria, said identifying including comparing the identified delivery times for the received television program listings and the identified scheduled times for each of the sporting events, said candidate television program listings having a delivery time corresponding to a scheduled time for a sporting event of the received sports schedule data;
   mapping via the processor the received sports schedule data with the received television program listing data for each of the identified candidate television program listings based on the received configurable criteria; and
   creating via the processor, for display to a user on a user computing device, an enhanced electronic programming guide as a function of the mapped sports schedule data and the television program listing data.

2. The computerized method of claim 1, wherein the sports schedule data further comprises one or more of the following for each of the plurality of sporting events: a title, a description, a start time, an end time, and a duration, wherein the television program listing data includes an episode title and reduced description for each of the program listings, and wherein interlinking the received sports schedule data with the received television program listing data for the identified candidate television program listings comprises:
   comparing the title in the sports schedule data with the episode title in the television program listing data for the identified candidate television program listings; and
   comparing the description in the sports schedule data with the reduced description in the television program listing data for the identified candidate television program listings.

3. The computerized method of claim 1, further comprising:
   receiving season data defining a season for each of the plurality of sporting events; and
   validating the sports schedule metadata by comparing the sports schedule metadata with the received season data.

4. The computerized method of claim 1, further comprising receiving override data identifying a portion of the sports schedule data and a corresponding program listing in the television program listing data.

5. The computerized method of claim 1, wherein the sports data provider comprises a first sports data provider, and further comprising:
   receiving additional sports schedule data from a second sports data provider; and
   mapping the additional sports schedule data with the sports schedule data received from the first sports data provider.

6. The computerized method of claim 1, further comprising configuring the criteria to account for changes to one or more of the following: the sports schedule data and the television program listing data.

7. The computerized method of claim 1, wherein one or more computer-readable storage media having stored thereon computer-executable instructions for performing the computerized method of claim 1.

8. One or more computer-readable storage media having stored thereon computer-executable components for creating an enhanced electronic programming guide, said components comprising:
   an interface component for storing in a memory area sports schedule data from a sports data provider, television program listing data from an electronic programming guide provider, and one or more configurable criteria defining characteristics of the sporting events from a rules provider, said sports schedule data representative of an event schedule for a particular sports league, said sports schedule data comprising metadata for a plurality of sporting events of the particular sports league, said metadata including a scheduled time for each of the plurality of sporting events, said television program listing data including program delivery times for a plurality of television program listings;

a comparison component executed by a processor for identifying the scheduled times included within the received metadata and the delivery times included within the received television program listings and, identifying one or more candidate television program listings based on the configurable criteria, wherein said identifying includes comparing the identified delivery times for the received television program listings and the identified scheduled times for each of the sporting events, said candidate television program listings having a delivery time corresponding to a scheduled time for a sporting event of the received sports schedule;

an interlink component executed by the processor for mapping the metadata for the plurality of sporting events with the television program listing data for each of the candidate television program listings identified by the comparison component; and a publication component executed by the processor for creating, for display to a user on a user computing device, an enhanced electronic programming guide with the metadata for the plurality of sporting events mapped to the television program listing data by the interlink component, wherein a computing device executes the interface component, the comparison component, the interlink component, and the publication component.

9. The computer-readable storage media of claim 8, wherein a change to the configurable criteria accounts for a change to the sports schedule data or the television program listing data, and wherein the comparison component, the interlink component, and the publication component include compiled binary files responsive to the change to the configurable criteria without recompilation.

10. A system for interlinking sporting event metadata and television program listing metadata, said system comprising:

a storage memory area storing sports schedule, an electronic programming guide including television program listing data, and configurable match rules, said sports schedule data representative of an event schedule for a particular sports league, said sports schedule data comprising metadata for a plurality of sporting events of the particular sports league, said metadata including a scheduled time for each of the plurality of sporting events, said television program listing data including program delivery times for a plurality of television program listings; and a processor executing computer-executable instructions stored on a computer-readable storage medium, said computer-executable instructions for:

identifying the scheduled times included within the sports schedule metadata;

identifying the delivery times included within the television program listings;

querying the television program listing data based on the configurable match rules for each of the plurality of sporting events, said match rules including rules based on comparing the identified delivery times for the received television program listings and the identified scheduled times for each of the sporting events;

identifying, from the queried television program listing data, one or more television program listings having a delivery time corresponding to a scheduled time for a sporting event represented by the sports schedule data;

mapping the metadata for the plurality of sporting events with the television program listing data for each of the identified television program listings; and updating the electronic programming guide with the mapped metadata.

11. The system of claim 10, further comprising a computer-readable storage medium having stored thereon a data structure representing override data that explicitly links a sporting event with a television program listing, said data structure comprising:

a league identifier field storing a value representing a league identifier;

a game identifier field storing a value representing a game identifier; and a program identifier field storing a value representing a television program listing.

12. The system of claim 10, further comprising a computer-readable storage medium having stored thereon a data structure representing a global sports format for storing sports schedule data, said data structure comprising:

a league field for storing a league identifier; and a game field storing a game identifier and start date value and a start time value associated therewith.

13. The system of claim 12, wherein the data structure further comprises a team sports field storing a home team identifier, a visiting team identifier, and an event name associated with the game identifier.

14. The system of claim 12, wherein the game field further stores a geographic location identifier storing a value associated with the game identifier.

15. The system of claim 10, further comprising binary files embodying the computer-executable instructions stored on the computer-readable storage medium, wherein the processor executes said computer-executable instructions for reconfiguring the match rules, and wherein the processor executes computer-executable instructions for identifying said scheduled times, identifying said delivery times, querying, identifying said television program listings, merging, and updating responsive to the reconfigured match rules without recompiling the binary files.

16. The system of claim 10, wherein the match rules comprise geographic criteria.

17. The system of claim 10, further comprising:

computerized means for storing sports schedule data in a global sports format; and computerized means for interlinking sporting event metadata and television program listing metadata.

18. The system of claim 10, wherein the storage memory area further stores in-season data to validate the sports schedule data, said in-season data defining in-season time periods for each of the plurality of sporting events.

* * * * *